(12) United States Patent
Leßmann et al.

(10) Patent No.: US 11,789,144 B2
(45) Date of Patent: Oct. 17, 2023

(54) METHOD FOR DETERMINING THE MOBILITY STATUS OF A TARGET OBJECT

(71) Applicant: Aptiv Technologies Limited, St. Michael (BB)

(72) Inventors: Stephanie Leßmann, Erkrath (DE); Uri Iurgel, Wuppertal (DE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 18/063,557

(22) Filed: Dec. 8, 2022

(65) Prior Publication Data

US 2023/0184932 A1   Jun. 15, 2023

(30) Foreign Application Priority Data

Dec. 9, 2021 (EP) .................................. 21213425

(51) Int. Cl.
*G01S 13/931* (2020.01)
*G01S 7/41* (2006.01)
*G01S 13/52* (2006.01)

(52) U.S. Cl.
CPC ............ *G01S 13/931* (2013.01); *G01S 7/415* (2013.01); *G01S 13/52* (2013.01); *G01S 2013/9327* (2020.01)

(58) Field of Classification Search
CPC ........ G01S 13/931; G01S 7/415; G01S 13/52; G01S 2013/9327
See application file for complete search history.

(56) References Cited

U.S. PATENT DOCUMENTS

| 6,873,251 B2 | 3/2005 | Schiffmann et al. |
| 9,229,102 B1* | 1/2016 | Wright ................. G01S 13/885 |
| 9,983,301 B2 | 5/2018 | Liu et al. |

(Continued)

FOREIGN PATENT DOCUMENTS

| CN | 102544755 | 12/2013 |
| CN | 107783137 | 3/2018 |

(Continued)

OTHER PUBLICATIONS

"Extended European Search Report", EP Application No. 20202060.8, dated Mar. 22, 2021, 8 pages.

(Continued)

*Primary Examiner* — Donald H B Braswell
(74) *Attorney, Agent, or Firm* — Colby Nipper PLLC (57) ABSTRACT

A method is provided for determining a mobility status of a target object located in an environment of a sensor configured to monitor a surrounding environment of a vehicle. According to the method, a detection angle of the target object is determined with respect to the sensor based on data acquired by the sensor, and an ideal beam vector for a stationary object is predicted based on the detection angle. The ideal beam vector and a measured beam vector obtained from the data acquired by the sensor are normalized, and a correlation of the normalized ideal beam vector and the normalized measured beam vector is determined. A score is determined based on the correlation of the normalized ideal and measured beam vectors and indicates whether the target object is stationary or moving.

20 Claims, 8 Drawing Sheets

(56) References Cited

U.S. PATENT DOCUMENTS

| | | | |
|---|---|---|---|
| 2011/0295549 A1* | 12/2011 | Takabayashi | G01S 13/86 |
| | | | 702/142 |
| 2015/0070207 A1* | 3/2015 | Millar | G01S 13/4454 |
| | | | 342/174 |
| 2015/0198697 A1* | 7/2015 | Kishigami | G01S 7/2923 |
| | | | 342/145 |
| 2016/0223651 A1 | 8/2016 | Kamo et al. | |
| 2017/0356991 A1* | 12/2017 | Yosoku | G01S 13/60 |
| 2018/0024235 A1 | 1/2018 | Hong et al. | |
| 2018/0024239 A1* | 1/2018 | Branson | G01S 13/52 |
| | | | 701/23 |
| 2018/0082137 A1 | 3/2018 | Melvin et al. | |
| 2018/0113195 A1 | 4/2018 | Bialer et al. | |
| 2018/0229770 A1 | 8/2018 | Kataoka et al. | |
| 2018/0341017 A1 | 11/2018 | Kamo et al. | |
| 2019/0056506 A1 | 2/2019 | Bialer | |
| 2019/0369222 A1 | 12/2019 | Oh et al. | |
| 2020/0059280 A1 | 2/2020 | Thurfjell et al. | |
| 2020/0160532 A1 | 5/2020 | Urtasun et al. | |
| 2020/0200871 A1 | 6/2020 | Patel et al. | |
| 2020/0225321 A1 | 7/2020 | Kruglick et al. | |
| 2020/0294401 A1 | 9/2020 | Kerecsen | |
| 2020/0355817 A1 | 11/2020 | Gillian et al. | |
| 2021/0026003 A1 | 1/2021 | Panzer | |
| 2021/0026006 A1 | 1/2021 | Steiner et al. | |
| 2021/0096241 A1 | 4/2021 | Bongio Karrman et al. | |
| 2021/0208272 A1 | 7/2021 | Lavian et al. | |
| 2021/0295113 A1 | 9/2021 | Sless et al. | |
| 2022/0026568 A1 | 1/2022 | Meuter et al. | |
| 2022/0120854 A1 | 4/2022 | Statnikov et al. | |
| 2022/0179060 A1* | 6/2022 | Hakobyan | G01S 13/588 |
| 2022/0209396 A1 | 6/2022 | Lee et al. | |
| 2022/0236400 A1 | 7/2022 | Iurgel et al. | |

FOREIGN PATENT DOCUMENTS

| | | |
|---|---|---|
| EP | 2390680 | 11/2011 |
| EP | 2983007 | 2/2016 |
| EP | 3252501 | 12/2017 |
| EP | 3279683 | 2/2018 |
| EP | 3285230 | 2/2018 |
| EP | 3318889 | 5/2018 |
| EP | 3702802 | 9/2020 |
| EP | 3767325 | 1/2021 |
| WO | 2020113160 | 6/2020 |
| WO | 2020113166 | 6/2020 |
| WO | 2020146428 | 7/2020 |

OTHER PUBLICATIONS

"Extended European Search Report", EP Application No. 20205146. 2, dated Apr. 26, 2021, 8 pages.
"Extended European Search Report", EP Application No. 21213425. 8, dated May 24, 2022, 6 pages.
"Extended European Search Report", EP Application No. 21159039. 3, dated Jul. 16, 2021, 11 pages.
"Extended European Search Report", EP Application No. 20187674. 5, dated Dec. 4, 2020, 11 pages.
"Frequency-Modulated Continuous-Wave Radar (FMCW Radar)", Retrieved at: https://www.radartutorial.eu/02.basics/Frequency%20Modulated%20Continuous%20Wave%20Radar.en.html—on Jul. 23, 2021, 6 pages.
Adavanne, et al., "Direction of Arrival Estimation for Multiple Sound Sources Using Convolutional Recurrent Neural Network", Aug. 5, 2018, 6 pages.
Bengtsson, "Models for tracking in automotive safety systems", Licentiate thesis, 2008, Jan. 2008, 189 pages.
Bialer, et al., "Performance Advantages of Deep Neural Networks for Angle of Arrival Estimation", Feb. 17, 2019, 5 pages.
Brooks, et al., "Complex-valued neural networks for fully-temporal micro-Doppler classification", Jun. 2019, 10 pages.
Jonas, et al., "Single-Snapshot Direction-of-Arrival Estimation of Multiple Targets Using a Multi-Layer Perceptron", Apr. 15, 2019, 4 pages.
Kederer, et al., "Direction of arrival (DOA) determination based on monopulse concepts", Feb. 2000, 5 pages.
Kellner, et al., "Instantaneous Ego-Motion Estimation using Doppler Radar", Oct. 2013, 8 pages.
Kellner, et al., "Instantaneous Ego-Motion Estimation using Multiple Doppler Radars", Jun. 2014, pp. 1592-1597.
Kellner, "Instantaneous Full-Motion Estimation of Arbitrary Objects using Dual Doppler Radar", Jun. 2014, 6 pages.
Kellner, et al., "Tracking of Extended Objects with High Resolution Doppler Radar", Dec. 2015, 13 pages.
Krim, "Two Decades of Array Signal Processing Research: The Parametric Approach", Jul. 1996, pp. 67-94.
Liu, et al., "Direction-of-Arrival Estimation Based on Deep Neural Networks With Robustness to Array Imperfections", Oct. 2018, 13 pages.
Mandic, et al., "Why a Complex Valued Solution for a Real Domain Problem", Sep. 2007, pp. 384-389.
Monning, et al., "Evaluation of Complex-Valued Neural Networks on Real-Valued Classification Tasks", Nov. 29, 2018, 18 pages.
Scardapane, et al., "Complex-Valued Neural Networks with Nonparametric Activation Functions", Feb. 22, 2018, 12 pages.
Schlichenmaier, et al., "Clustering of Closely Adjacent Extended Objects in Radar Images using Velocity Profile Analysis", Apr. 2019, 5 pages.
Schlichenmaier, et al., "Instantaneous Actual Motion Estimation with a Single High-Resolution Radar Sensor", Apr. 2018, 5 pages.
Swindlehurst, et al., "Application Of Music To Arrays With Multiple Invariances", Jun. 2000, pp. 3057-3060.
Terabayashi, "Ultrawideband Direction-of-Arrival Estimation Using Complex-Valued Spatiotemporal Neural Networks", Sep. 2014, pp. 1727-1732.
"Extended European Search Report", EP Application No. 21153435. 9, dated Jun. 29, 2021, 9 pages.
Di Serio, et al., "2D-MIMO Radar: A Method for Array Performance Assessment and Design of a Planar Antenna Array", Mar. 2020, 14 pages.
Kellner, et al., "Joint Radar Alignment and Odometry Calibration", 18th International Conference on Information Fusion, Washington, DC 2015, Jul. 2015, 9 pages.
"Non-Final Office Action", U.S. Appl. No. 17/584,277, filed May 18, 2023, 12 pages.
"Non-Final Office Action", U.S. Appl. No. 17/384,493, dated Jun. 8, 2023, 18 pages.

* cited by examiner

METHOD FOR DETERMINING THE MOBILITY STATUS OF A TARGET OBJECT

INCORPORATION BY REFERENCE

This application claims priority to European Patent Application Number EP21213425.8, filed Dec. 9, 2021, the disclosure of which is incorporated by reference in its entirety.

BACKGROUND

When processing radar detections provided by a radar system, it is often a prerequisite for proper results that the detections originate from stationary targets. In other words, it may be required to distinguish whether a radar detection is provided by a stationary or a moving target. One application which is based on detections from stationary targets is estimating an azimuth angle from a range rate (AFRR) provided by the radar system.

Detections from moving and stationary targets are usually distinguished by comparing a measured range rate with an expected range rate from a stationary target. If the deviation between the actual and expected range rates is smaller than a predetermined threshold, the radar detection is regarded as originating from a stationary target. However, estimating the expected range rate requires determining the azimuth angle of the target object under consideration. Therefore, performing a "full classical" angle finding method may be required to carry out such a stationary versus moving check for the target object. The full classical angle finding methods may rely on Fourier transform techniques or on an iterative adaptive approach (IAA), amongst others.

Besides, radar angle finding usually needs some kind of ground truth measurement of the angle which may be performed in an anechoic chamber. However, measurements in such an anechoic chamber are usually cumbersome. In addition, the characteristics of the radar system may be affected if the radar system is mounted in a vehicle after the calibration in the anechoic chamber.

Accordingly, there is a need to provide a method and a system for determining the mobility status of a target object without performing a full classical angle finding algorithm.

SUMMARY

The present disclosure relates to methods and systems for determining the mobility status of a target object, i.e. for determining whether a target object is stationary or moving. The present disclosure provides a computer implemented method, a computer system and a non-transitory computer readable medium according to the independent claims. Example embodiments are given in the subclaims, the description and the drawings.

In one aspect, the present disclosure is directed at a computer implemented method for determining a mobility status of a target object located in an environment of a sensor configured to monitor a surrounding environment of a vehicle. The method comprises the following steps performed by computer hardware components: determining a detection angle of the target object with respect to the sensor based on data acquired by the sensor; predicting an ideal beam vector for a stationary object based on the detection angle; normalizing the ideal beam vector and a measured beam vector which is obtained from the data acquired by the sensor; determining a correlation of the normalized ideal beam vector and the normalized measured beam vector; and determining, based on the correlation of the normalized ideal and measured beam vectors, a score indicating whether the target object is stationary or moving.

The sensor may be a radar sensor, and the detection angle may be the azimuth angle with respect to a boresight direction of the sensor. Further, the target object may be located in an external environment of a host vehicle in which the sensor is installed, and the sensor may therefore be configured to monitor the environment of the host vehicle.

For performing the method, the detection angle may be determined e.g. based on a range rate or "Doppler" which is given as the negative value of the range rate provided by sensor detections, e.g. radar detections. As a result, the computational effort required for angle detection may be reduced in comparison to the classical angle finding methods. For the detection angle determined according to the proposed method, the ideal beam vector is predicted and correlated with the beam vector based on the data acquired by the sensor, wherein such a measured beam vector may be provided e.g. by a Fourier transform of the sensor detections as is known in the field of radar technology. Based on this correlation of the beam vectors, the score is determined as a measure for the target object to be stationary. In a similar manner as a probability, a score being greater than a first threshold, e.g. close to 1, may indicate that the target object is stationary, whereas a score which is lower than a second threshold being equal to or smaller than the first threshold, e.g. close to 0, may indicate that the target object is not stationary, e.g. a moving object or an outlier. A stationary target object may be assumed if the score exceeds a predefined value. In summary, the method requires a low computational effort since the stationary/moving test mostly relies on the correlation of the ideal and measured beam vectors determined for the target object. The result of the method, i.e. the information whether the target object is stationary or moving, may be used by further applications which are installed e.g. in a vehicle. Such applications may include angle finding from range rate (AFFR).

According to an embodiment, the sensor may include a radar sensor, and the sensor data may include a range rate determined based on radar detections of the radar sensor. The detection angle of the target object may therefore be determined in a direct and efficient way.

According to a further embodiment, the detection angle of the target object may be determined by solving an algebraic equation, leading to a further reduction of the computational effort of the method.

The algebraic equation for determining the detection or azimuth angle $\theta_D$ may be based on the following equation for a Doppler d (which is given as the negative value of the range rate), wherein $v_x^s$, $v_y^s$ may represent sensor velocities, e.g. if the sensor is installed in a vehicle:

$$d = \cos(\theta_D)v_x^S + \sin(\theta_D)v_y^S$$

$$\Leftrightarrow \frac{d}{\cos(\theta_D)} = v_x^S + \tan(\theta_D)v_y^S$$

With the substitution $\theta := \arctan(x)$ and the identity $$\cos(\arctan(x)) = \frac{1}{\sqrt{1+x^2}},$$

one may receive:

$$d\sqrt{1+x^2} = v_x^s + x\, v_y^s$$

This may lead to the quadratic equation:

$$x^2 + \frac{2 \cdot v_x^S \cdot v_y^S}{(v_y^S)^2 - d^2} \cdot x + \frac{(v_x^S)^2 - d^2}{(v_y^S)^2 - d^2} = 0$$

Applying standard p-q-formulae to solve for x and some simplifications may result in:

$$x_{1/2} = \frac{-v_x^S \cdot v_y^S \pm d \cdot \sqrt{(v_x^S)^2 + (v_y^S)^2 - 1}}{(v_y^S)^2 - d^2}$$

It is necessary to check for $(v_x^s)^2+(v_y^s)^2 \geq 1$ and $(v_y^s)^2 - d^2 \neq 0$ beforehand to get valid solutions. A re-substitution may yield the result for $\theta_{D_{1/2}}* = \arctan(x_{1/2})$.

An ambiguity may be determined for the solution of the algebraic equation. If such an ambiguity is determined, a correlation of a beam vector derived from sensor data and of a reference vector may be used in order to resolve the ambiguity. By resolving the ambiguity, the reliability of the method may be further improved. The reference vector may include data based from a reflection point originating from a predetermined axis, e.g. at boresight with respect to the sensor.

According to a further embodiment, the sensor may include a radar sensor comprising a plurality of equally spaced antenna elements. The ideal beam vector may depend on a ratio of the constant distance between the antenna elements and a wavelength of radar waves transmitted by the radar sensor. Moreover, a product of the ratio and the sine of the detection angle may define a phase relationship between components of the ideal beam vector. Therefore, predicting the ideal beam vector may be performed in an efficient manner with low computational effort.

Calculating the correlation of the normalized ideal and measured beam vectors may include calculating a cosine coefficient based on the normalized ideal beam vector and the normalized measured beam vector. Before normalizing the measured beam vector and calculating the cosine coefficient, a calibration matrix of the sensor may be applied to the measured beam vector. The measured beam vector may be multiplied by the calibration matrix and normalized thereafter, and an inner product of the result and the ideal beam vector may be calculated in order to provide the cosine coefficient.

The calibration matrix may be determined based on an initial diagonal calibration matrix which may be determined empirically, e.g. in an anechoic chamber at an azimuth angle of zero degree. Alternatively, the calibration matrix may be initialized via statistical methods. In both cases, the calibration matrix may be available for the method, e.g. by obtaining the calibration matrix from a database where the calibration matrix is stored after performing one of the calibration procedures.

The absolute value of the cosine coefficient may directly provide the score for the target object being stationary. In detail, the score may be equal to the absolute value of the cosine coefficient. The target object may be determined to be stationary if the score or the absolute value of the cosine coefficient is greater than a predetermined threshold. The threshold may include a value of approximately 0.9 such that the threshold may be in a range e.g. from 0.88 to 0.92. By the threshold for the score or absolute value of the cosine coefficient, two classes of target objects may be defined, i.e. one class for stationary objects and one class for moving objects or outliers. Hence, it may be decided in an efficient manner based on the absolute value of the cosine coefficient and the threshold whether the target object is stationary or moving.

According to a further embodiment, it may be determined for a plurality of detected target objects whether each of the respective target objects is stationary, and based on the number of detected stationary target objects, at least one dynamic parameter of a vehicle at which the sensor is installed may be determined. For example, the ego-motion of the vehicle may be determined based on the target objects which are determined to be stationary, while moving target objects or outliers are not considered. The at least one dynamic parameter may include a linear velocity and/or an angular velocity of the vehicle.

In another aspect, the present disclosure is directed at a computer system, said computer system comprising a plurality of computer hardware components configured to carry out several or all steps of the computer implemented method described herein. Therefore, aspects and the disclosure as described above for the method are also valid for the computer system.

The computer system may comprise a plurality of computer hardware components, for example a processor, a processing unit or a processing network, at least one memory, for example a memory unit or a memory network, and at least one non-transitory data storage. It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

According to another aspect, the computer system further comprises: a radar sensor configured to acquire radar detections; wherein the computer system is configured to determine a range rate based on the radar detections; and wherein the computer system is configured to determine a measured beam vector based on the radar detections.

According to another aspect, the radar sensor comprises a plurality of antenna elements, for example arranged as an antenna array.

In another aspect, the present disclosure is directed at a vehicle comprising the computer system as described herein; and a radar sensor.

As used herein, the terms processing device and processing unit may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The processing device and the processing unit may include memory (shared, dedicated, or group) that stores code executed by the processor.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE FIGURES

Example embodiments and functions of the present disclosure are described herein in conjunction with the following drawings, showing schematically:

FIGS. 4A and 4B show two pictures as an example for a real data scenario, FIG. 5 results of the stationary/moving check using the method according to the disclosure for the real data scenario as shown in FIGS. 4A and 4B, FIG. 6 a flow diagram illustrating a method for determining a mobility status of a target object according to various embodiments, FIG. 7 a system for a stationary check according to various embodiments, and FIG. 8 a computer system with a plurality of computer hardware components configured to carry out steps of a computer implemented method for determining a mobility status of a target object according to various embodiments.

DETAILED DESCRIPTION

Figure 1:
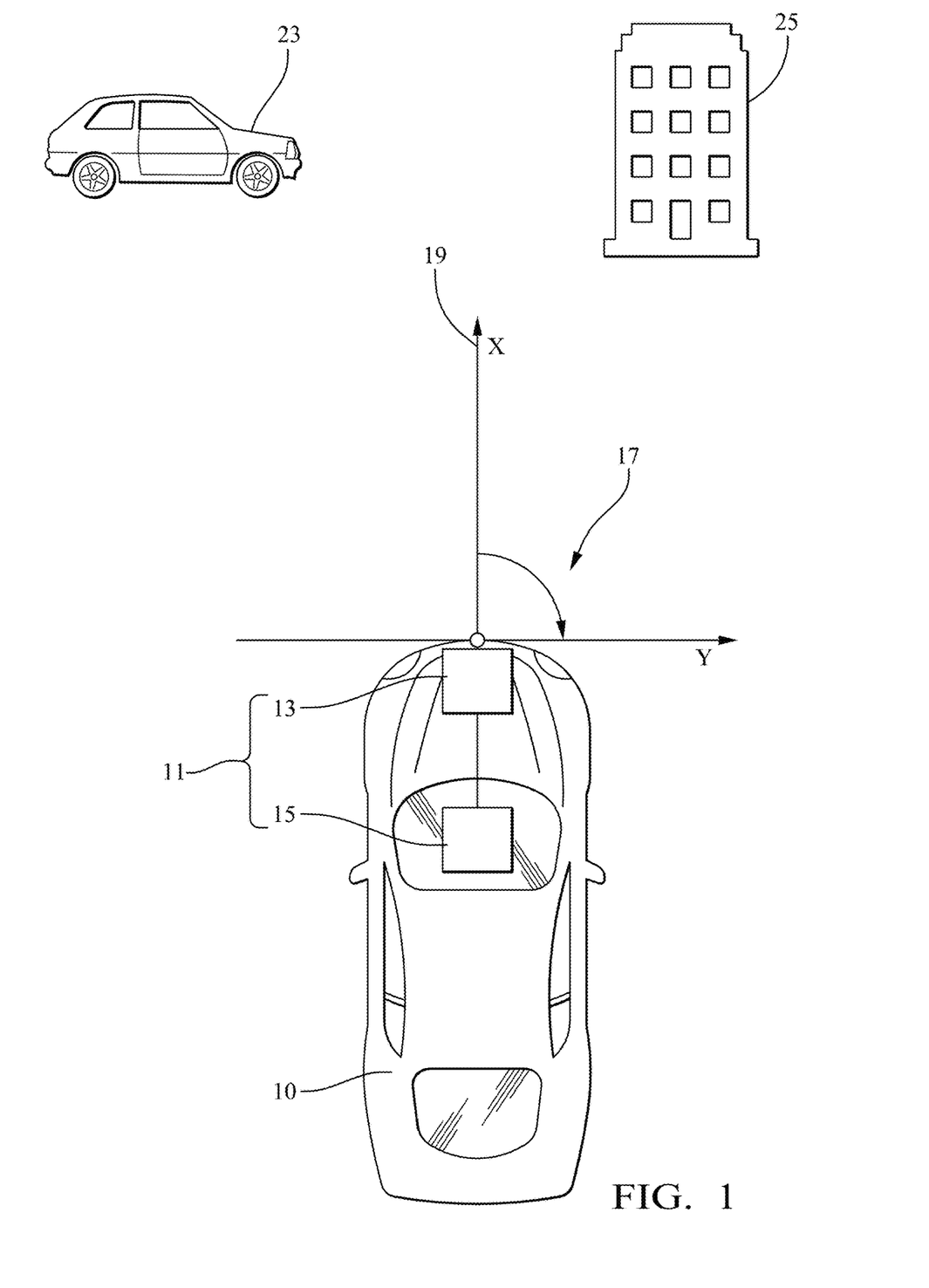
FIG. 1 shows a vehicle including a computer system configured to carry out a method according to the disclosure.

FIG. 1 depicts a vehicle 10 including a computer system 11 for carrying out a method for determining a mobility status of a target object, i.e. for determining whether a target object is stationary or moving. The computer system 11 includes a radar sensor 13 and a processing unit 15 which is connected to the radar sensor 13 and configured to receive data acquired by the radar sensor 13 and to analyze these data according to the steps of the method.

Relative to the radar sensor 13, a sensor-based coordinate system 17 is defined which includes an x-axis 19 and a y-axis 21, wherein the x-axis 19 coincides with the longitudinal axis of the vehicle 10, whereas the y-axis 21 coincides with the lateral axis with respect to the vehicle 10.

The radar sensor 13 is configured to transmit radar waves and to provide radar detections $r_{det}$ which originate from radar waves being reflected by target objects 23, 25. The target objects 23, 25 include two different classes of objects, i.e. a class for moving objects 23, like other vehicles, and a class for stationary objects 25, like buildings etc.

For some radar-based applications, it is important to distinguish between radar detections $r_{det}$ originating from stationary target objects 25 and radar detections $r_{det}$ originating from moving target objects 23 or outliers. For example, determining a detection or azimuth angle from range rate (AFRR) requires stationary target objects 25.

Classically, moving and stationary detections are distinguished by comparing the actual Doppler $d_{act}$ (or range rate) and the Doppler d (or range rate) that is expected for a stationary detection. It is noted that the term "Doppler" stands for the negative value of the range rate. The calculation of d, however, requires the azimuth angle θ of a radar detection and the velocity vector as well as the yaw rate, i.e. ($v_{veh}$, ω), of the host vehicle 10 with the equation $$v_x = -\omega \cdot L_y + v_x^{Veh} \text{ and } v_y = \omega \cdot L_x + v_y^{Veh}, \quad (1)$$

wherein $L_x$, $L_y$ represent the mounting position of the radar sensor 13, and $v_{x,y}^{Veh}$ is the velocity vector of the radar sensor 13 in a vehicle coordinate system.

Using a rotation matrix $R_{\theta_M}$ of the mounting orientation $\theta_M$ of the radar sensor 13 with respect to the longitudinal axis of the host vehicle 10, one can calculate the velocity vector $v_{x,y}^s$ of the radar sensor 13 in the sensor coordinate system 17:

$$\begin{bmatrix} v_x^S \\ v_y^S \end{bmatrix} = R_{\theta_M} \cdot \begin{bmatrix} v_x \\ v_y \end{bmatrix}, \quad (2)$$

and then the expected Doppler under the assumption that the detection is provided by a stationary target object 25:

$$d = \cos(\theta) v_x^s + \sin(\theta) v_y^s. \quad (3)$$

If the deviation between the actual Doppler $d_{act}$ and the expected Doppler d is lower than a predefined threshold T, i.e. $|d - d_{act}| < T$, the detection is considered as stationary, i.e. originating from a stationary target object 25. However, without applying e.g. a classical full angle finding algorithm, the angle θ is unknown and this kind of stationary/moving check is not applicable.

Hence, the present disclosure provides a method for determining whether a target object is stationary or moving, wherein the method includes five basic steps described below. As an input, the method requires a measured beam vector b and a related Doppler d (or range rate) which are based on radar detections provided by the radar sensor 13 (see FIG. 1). In addition, information about the motion of the host vehicle 10 is required, i.e. its velocity and its yaw rate.

A first step includes calculating a detection or azimuth angle $\theta_D$ from the Doppler d using the motion of the host vehicle.

Although other geometric and numerical methods may be applied for determining the azimuth angle $\theta_D$ based on the radar detections, for the present embodiment the following algebraic equation is solved for the azimuth angle $\theta_D$ (wherein $v_x^s$, $v_y^s$ are the sensor velocities as described above):

$$d = \cos(\theta_D) v_x^S + \sin(\theta_D) v_y^S \quad (4)$$

$$\Leftrightarrow \frac{d}{\cos(\theta_D)} = v_x^S + \tan(\theta_D) v_y^S$$

With the substitution θ:=arctan (x) and the identity $$\cos(\arctan(x)) = \frac{1}{\sqrt{1 + x^2}},$$

one receives:

$$d\sqrt{1+x^2} = v_x^s + x \, v_y^s \quad (5)$$

This leads to a quadratic equation:

$$x^2 + \frac{2 \cdot v_x^S \cdot v_y^S}{(v_y^S)^2 - d^2} \cdot x + \frac{(v_x^S)^2 - d^2}{(v_y^S)^2 - d^2} = 0 \qquad (6)$$

Applying standard p-q-formulae to solve for x and some simplifications result in:

$$x_{1/2} = \frac{-v_x^S \cdot v_y^S \pm d \cdot \sqrt{(v_x^S)^2 + (v_y^S)^2 - 1}}{(v_y^S)^2 - d^2} \qquad (7)$$

It is necessary to check for $(v_x^s)^2 + (v_y^s)^2 \geq 1$ and $(v_y^s)^2 - d^2 \neq 0$ beforehand to get valid solutions. A re-substitution yields the result for $\theta_{D_{1/2}}* = \arctan(x_{1/2})$.

Since a quadratic equation is solved in order to determine $\theta_D$, there are usually two ambiguous solutions. This ambiguity can be resolved by considering a correlation between the measured beam vector b and a reference vector which includes data based from a reflection point originating from a predetermined axis, e.g. at boresight with respect to the radar sensor 13. After resolving the ambiguity of the solutions of the quadratic equation, the final $\theta_D$ is received. Strictly speaking, this detection angle $\theta_D$ is valid for detections from stationary target objects 25 only. Therefore, the further method steps are performed in order to determine a measure or degree for $\theta_D$ and the underlying radar detection $r_{det}$ originating from a stationary target object 25.

As a second method step, an ideal beam vector is predicted for the detection angle $\theta_D$. For the present embodiment, the ideal beam vector is given by:

$$a_{ideal}(\theta_D) = [1, \exp(-i\omega), \ldots \exp(-i\omega n)]$$

with $\omega = d \cdot \sin(\theta_D)$, \qquad (8)

wherein $a_{ideal}$ is the predicted ideal beam vector, n is the number of antenna elements included in the radar sensor 13, and d is the ratio of a distance between the antenna elements and the wavelength of the radar waves which are transmitted by the radar sensor 13. It is assumed that the n antenna elements of the radar sensor 13 are equally spaced, i.e. that they have a constant distance therebetween.

It is noted that the number n of the antenna elements may not only represent a number of "real" physical antennas belonging to the radar system 13, but also a number of virtual antennas for which the respective beam vectors may be defined, as is known in the art. Generally, the components of the beam vectors are based on a Fourier transform of raw data received by the respective real or virtual antennas.

In a third step, the measured beam vector b is calibrated. That is, the measured beam vector b which is based on the raw radar detection $r_{det}$ for a given point in time is calibrated by multiplying the normalized beam vector by a calibration matrix C which reflects the characteristics of the radar sensor 13. The calibration matrix C may be based on an initial diagonal calibration matrix which is determined e.g. by a measurement in an anechoic chamber using a measured beam vector at an azimuth angle of zero degrees only. Alternatively, an algorithm for initializing the calibration matrix C may be used which is based on statistical methods.

Thereafter, the ideal beam vector $a_{ideal}$ and the calibrated measured beam vector are normalized as follows:

$$\tilde{a}_{ideal}(\theta_D) = \frac{a_{ideal}(\theta_D)}{\|a_{ideal}(\theta_D)\|_2}, \tilde{b} = \frac{Cb}{\|Cb\|_2} \qquad (9)$$

The denominators on the right side of these formulas denote the usual Euclidean norm of the respective vectors. The normalization of the vectors is necessary since the phase or cosine coefficient between these vectors has to be considered for the stationary check as described in the following.

As an alternative to multiplying the calibration matrix and the measured beam vector, the ideal beam vector and the calibration matrix may be multiplied before the normalization. This may save computational effort if similar values for the Doppler occur which are related to the respective radar detection $r_{det}$, i.e. if similar Doppler values are determined for different range bins.

In a fourth step, a cosine coefficient is calculated for the beam vectors as a correlation between these as follows:

$$\psi = |\cos(\alpha)| = |(\tilde{a}_{ideal}(\theta_D))^H \cdot \tilde{b}| \qquad (10)$$

The values of $\psi$ lie in the interval of [0, 1] and can be interpreted as a score for the target object 23, 25 (from which the respective radar detection $r_{det}$ originates) being a stationary target object 25. In a similar manner as a probability, a score being close to 1 indicates that the target object 25 is stationary, whereas a low score (e.g. being close to 0) indicates that the target object 25 is not stationary, i.e. a moving object or an outlier.

As a fifth step, the score $\psi$ is compared with a threshold $\tau$ in order to assign the respective radar detection $r_{det}$ and the corresponding target object 23, 25 (see FIG. 1) to a class S of stationary target objects 25 or to a class M of moving target objects 23 or outliers. This can be described mathematically as follows:

$$r_{det} \in \begin{cases} S, & \varphi > \tau \\ M, & \varphi \leq \tau \end{cases} \qquad (11)$$

A suitable value for c can be determined empirically and is typically about 0.9, e.g. 0.92.

The results of the method may be applied for estimating the ego-motion of the vehicle 10. The term "ego-motion" includes the linear velocity and the angular velocity of the host vehicle 10 as part of its dynamic variables.

As described e.g. in US 2019/0369222 A1, measurements of the angle from range rate (AFRR) may be used in order to estimate the ego-motion by solving a linear equation system which is similar to the equations (1) to (3) mentioned above. However, detections from stationary target objects 25 have to be assumed since moving target objects 23 or noise may lead to substantial errors in the estimation.

Therefore, estimating the ego-motion is typically embedded into an iterative approach in order to filter out moving target objects 23 and/or outliers. The known approach as described in the reference mentioned above is typically based on a direct angle measurement and a threshold based on the Doppler or range rate. The approach as described in this reference is called "random sample consensus (RANSAC)" calculation.

The results of the method for determining a mobility status of a target object according to the disclosure can be used to modify and simplify the known RANSAC approach. In detail, three radar detections are selected randomly, and the ego-motion is estimated based on these detections.

Thereafter, the first four steps of the method as described above are performed for all radar detections, i.e. up to calculating the cosine coefficient. Thereafter, a threshold is applied to the cosine coefficients in order to determine the number of "inliers" i.e. the number of stationary target objects 25 with respect to the three randomly selected detections. These steps are repeated iteratively starting with the selection of three random detections, and the number of inliers is determined for each iteration. Finally, the iteration having the most inliers is stored as the result for estimating the ego-motion of the vehicle 10. As an optional step, the ego-motion may be estimated for all final inliers.

In order to verify the method according to the disclosure, different simulations and experiments have been performed based on simulated and real data. The results of the simulations and experiments are depicted in FIGS. 2A, 2B, 2C, 3A, 3B, 4A, 4B, and 5.

Figure 2A:
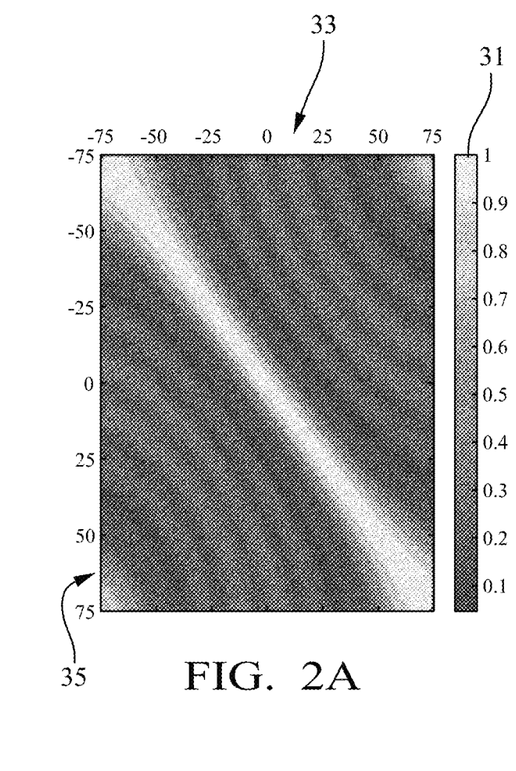
FIGS. 2A, 2B, and 2C show simulation results for a cosine coefficient under different conditions.
Figure 2B:
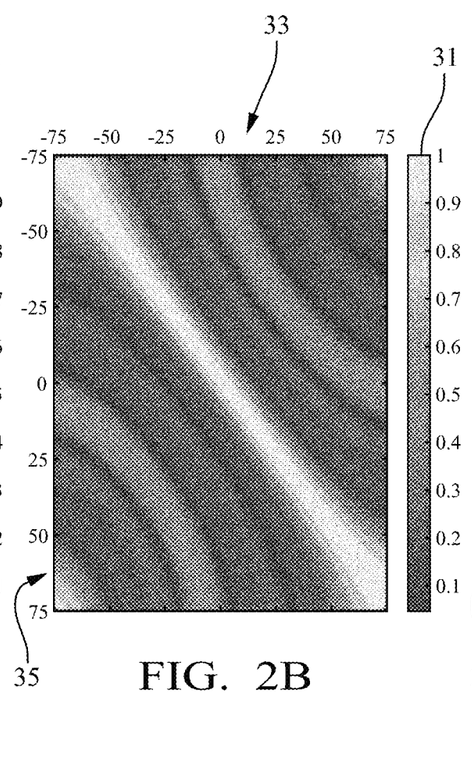
Figure 2C:
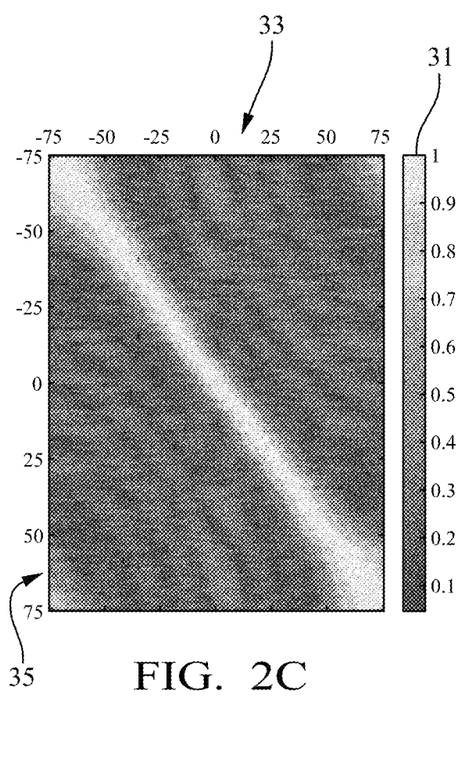

FIGS. 2A, 2B, 2C depict simulated cosine coefficients for different conditions. The values of the cosine coefficients are represented by a varying brightness as indicated by the bars 31. A high brightness indicates an absolute value of the cosine coefficient close to one, whereas a low brightness indicates an absolute value of the cosine coefficient close to zero. The absolute value of the cosine coefficients is depicted depending from the angle of the ideal beam vector on the x-axis and depending from the angle of the simulated measured beam vector on the y-axis.

That is, all combinations for the azimuth angles have been simulated in order to generate all potential cosine coefficients. Therefore, the angle of the measured beam vector b and the angle of the ideal beam vector (see also formula 8) have been considered independently for the simulations.

The radar sensor assumed for the simulations includes two transmission channels and four receiver channels, corresponding to a standard radar system known in the art. For the data as shown in FIG. 2A, noise free conditions and an elevation angle of 0° have been assumed, whereas for the results as shown in FIG. 2B an elevation angle of 7° has been assumed, and for the results of FIG. 2C a noise condition having a signal to noise ratio of 20 dB for the reflection at the target object 23, 25 has been provided at an elevation angle of 0°.

The aim of the simulation is to assess whether the method according to the disclosure is able to separate the two classes of target objects 23, 25, i.e. stationary objects 25 from moving objects 23 and outliers, for the different conditions. In an ideal case, a high correlation value (or absolute value of the cosine coefficient) is expected on the diagonal of the "angle matrix", i.e. on the diagonal in the diagrams of FIGS. 2A, 2B, 2C from the upper left corner to the lower right corner. As can be seen in all three diagrams of FIGS. 2A, 2B, 2C, the expected separation of the two classes is sufficient enough for the noise free condition (FIG. 2A), and with adding the elevation angle of 7° (FIG. 2B) as well as for the additional noise (FIG. 2C) since high absolute values for the cosine coefficient occur close to the diagonal of the respective diagram only. Due to these results, it is possible to perform the method according to the disclosure also on sub-arrays of the full antenna array of the radar sensor in order to get full independence from the elevation angle.

Figure 3A:
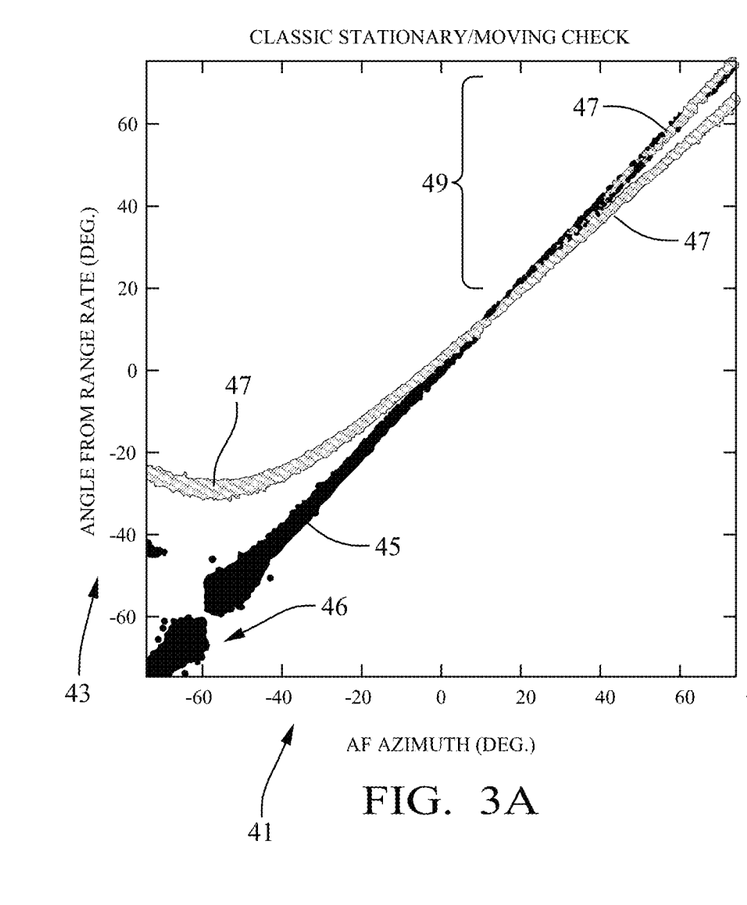
FIGS. 3A and 3B show a comparison of a classical stationary/moving check using full angle finding versus a stationary/moving check using the method according to the disclosure.
Figure 3B:
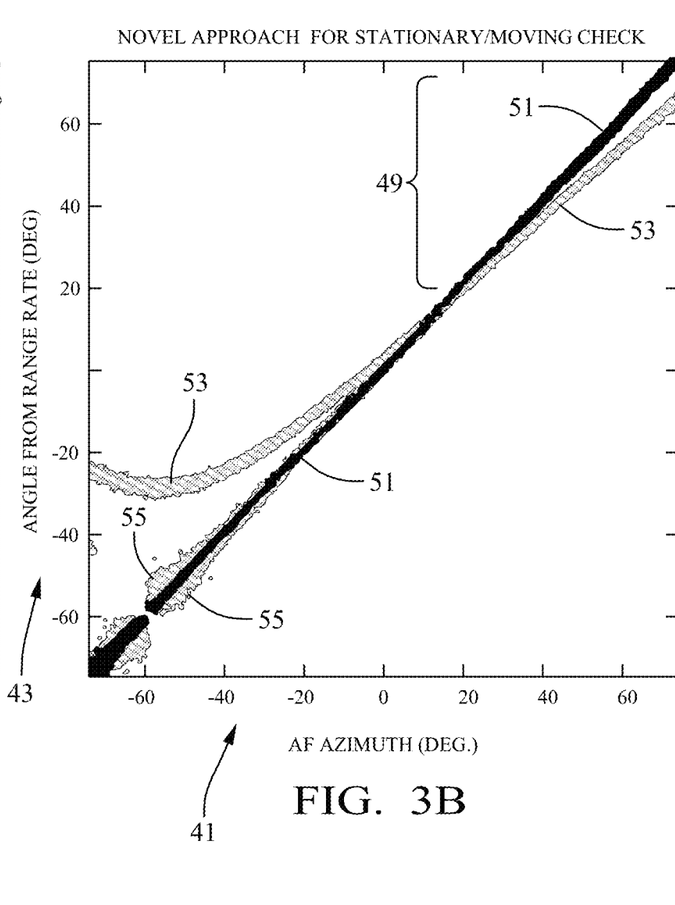

FIGS. 3A and 3B depict a comparison between a classical stationary/moving check and a stationary/moving check based on the method according to the present disclosure. The results of the respective check, i.e. the classification of target object 23, 25 as stationary or moving, is represented depending from the azimuth angle from classical angle finding (in degrees) on the x-axis and depending from the azimuth angle from range rate (in degrees) on the y-axis.

The data as shown in FIGS. 3A and 3B has been simulated for an ego or host vehicle 10 (see FIG. 1) having a velocity of 15 m/s, and for an additional moving target 23 having a velocity of 13 m/s and a yaw rate of 10 degrees/s. For the simulations, an ideal Doppler value and ideal beam vectors have been calculated for every possible angles of stationary target objects 25 and moving target objects 23. Gaussian noise has been added for both kinds of simulations.

For the classical approach providing the results of FIG. 3A, beam forming has been applied to the generated beam vectors for calculating the respective angles, and then the Doppler values have been used for applying the stationary/moving check. That is, the results as shown in FIG. 3A have been determined as described in context of formulas (1) to (3) above, i.e. the stationary/moving check has been performed based on the deviation between the actual Doppler and the expected Doppler. For the method according to the disclosure (FIG. 3B), the angles have been calculated backwards from the Doppler or range rate values, and the stationary/moving check has been applied to the beam vectors as described above in context of formulas (4) to (11).

In FIG. 3A, the target objects 25 classified as stationary are represented by the curve 45 close to the diagonal of the diagram from the lower left corner to the upper right corner. The gap shown at 46 is due to an area with low accuracy for the angle from range rate in the assumed driving direction of the vehicle 10. The target objects 23 classified as moving or outliers are represented by the curve 47 which generally should deviate from the diagonal of the diagram. However, in the range starting from about 20 degrees, i.e. in the region denoted by 49, the objects which should be classified as stationary are classified as moving, i.e. on the diagonal of the diagram, in addition to the objects for which the simulation results deviate from the diagonal.

In FIG. 3B, the target objects 25 classified as stationary are represented by the curve 51, whereas the target objects 23 classified as moving or outliers are represented by the curve 53. As can be seen in the region denoted by 49, the method according to the disclosure can clearly distinguish between stationary and moving objects also in the region above 20 degrees. Furthermore, in the region below −40 degrees, the method is also able to distinguish between stationary objects and outliers which are represented by the point clouds 55 on the right and left side of the curve 51 representing stationary target objects 25. For better orientation, artificial thin white lines are included between the points clouds 55 representing outliers or moving objects and the curve 51 representing stationary objects.

In summary, the method according to the disclosure is able to overcome at least two drawbacks of the classical stationary/moving check, i.e. the false classification of stationary objects as moving, i.e. in the region 49 above 20 degrees, and the missing identification of outliers which are identified by the method according to the disclosure via the point clouds 55.

Figure 4A:
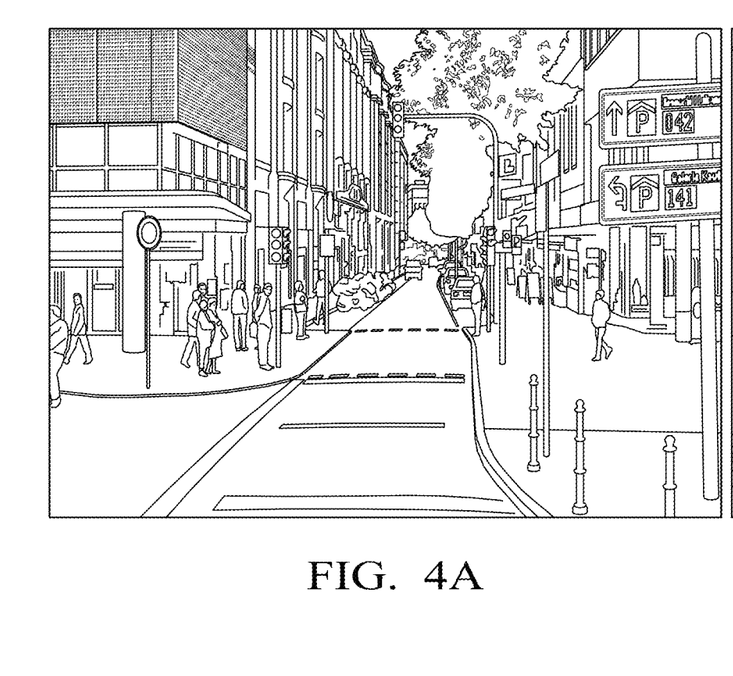
Figure 4B:
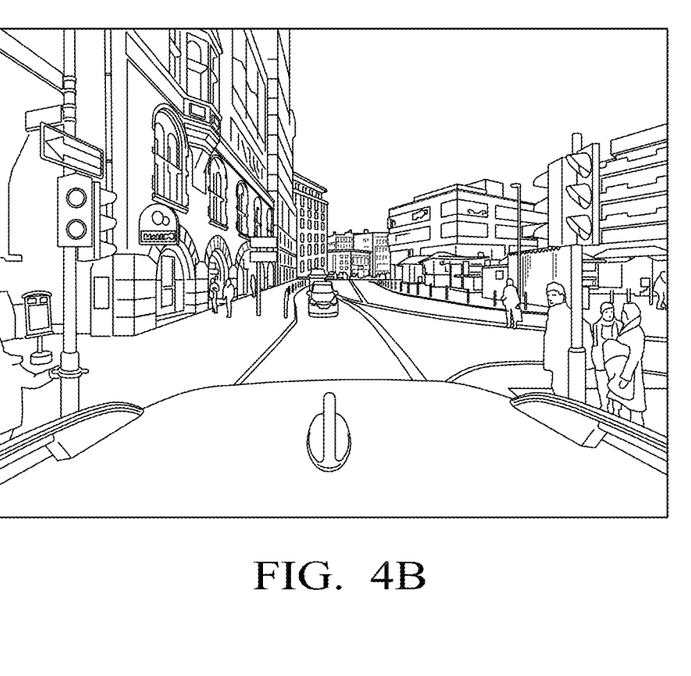

In addition to the simulations, the method according to the disclosure is also applied to a real data scenario for which radar data is acquired by a standard radar system which is installed in a vehicle. The observed real data scenario is shown in FIGS. 4A and 4B, wherein in FIG. 4A depicts the view from the front of the vehicle, whereas FIG. 4B represents the view from the rear of the vehicle. As can be recognized in FIGS. 4A and 4B, the real data scenario includes moving vehicles, slowly moving pedestrians and stationary target objects in a city. In order to provide a circumferential view with respect to the vehicle, six radars are installed at the vehicle. For each of the six radars, the respective boresight direction proceeds to the rear left, to the rear right, to the front right, to the front left, to the center left, and to the center right with respect to the vehicle. For each of these directions, a corresponding diagram is shown in FIG. 5 for verifying the method according to the disclosure.

Figure 5:
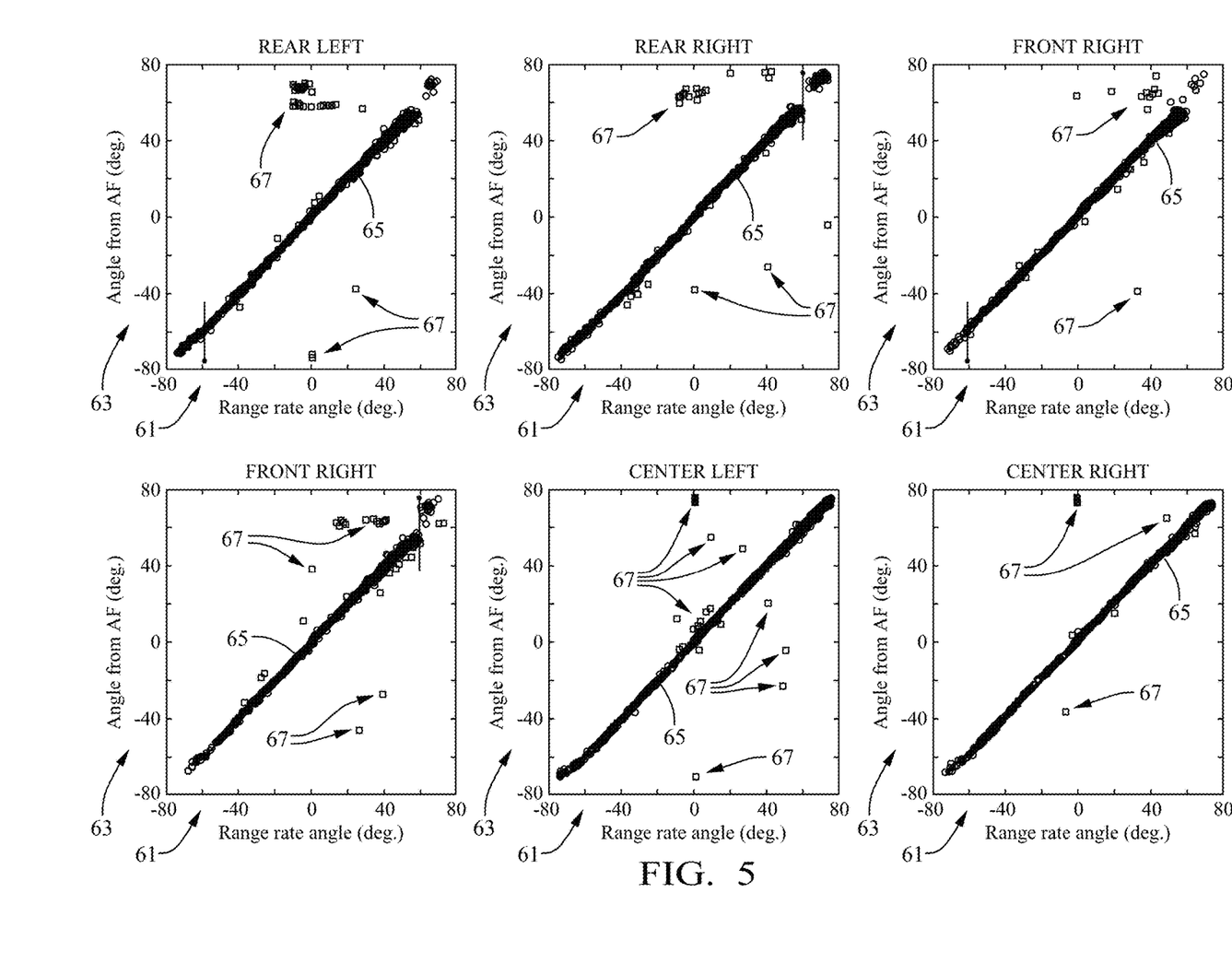

For the real data scenario of FIGS. 4A and 4B, the results for applying the method according to the disclosure are shown in FIG. 5. For all diagrams of FIG. 5, the classification of target objects 23, 25 is shown depending from the angle from range rate (in degrees) on the x-axis and depending from an angle determined by a Fourier transformation (in degrees) on the y-axis, i.e. an angle determined by classical angle finding as described above in context of FIG. 3A. The angle from range rate is denoted by 61, whereas the angle from the Fourier transform is denoted by 63. The six diagrams as shown in FIG. 5 are determined for different directions, i.e. for the rear left, for the rear right, for the front right, for the front left, for the center left, and for the center right when viewed from the vehicle.

In each of these diagrams, the target objects 25 classified as stationary are indicated by circles 65 (blue circles), whereas the target objects 23 classified as moving or outliers are represented by the circles 67 (red circles). As can be recognized in all diagrams, the stationary objects 25 are located close to the diagonal of the diagram, as expected. In contrast, the objects belonging to the circles 67 classified as moving or outliers are well separated from the diagonal and from the stationary objects. The circles 67 are likely to indicate moving objects if they are clustered in a region which has some distance to the diagonal, whereas the circles 67 are likely to indicate outliers if the circles 67 are separated from each other and single points. In summary, the method according to the disclosure is able to distinguish between stationary target objects 25 and moving target objects 23 properly also for the real data scenario.

Figure 6:
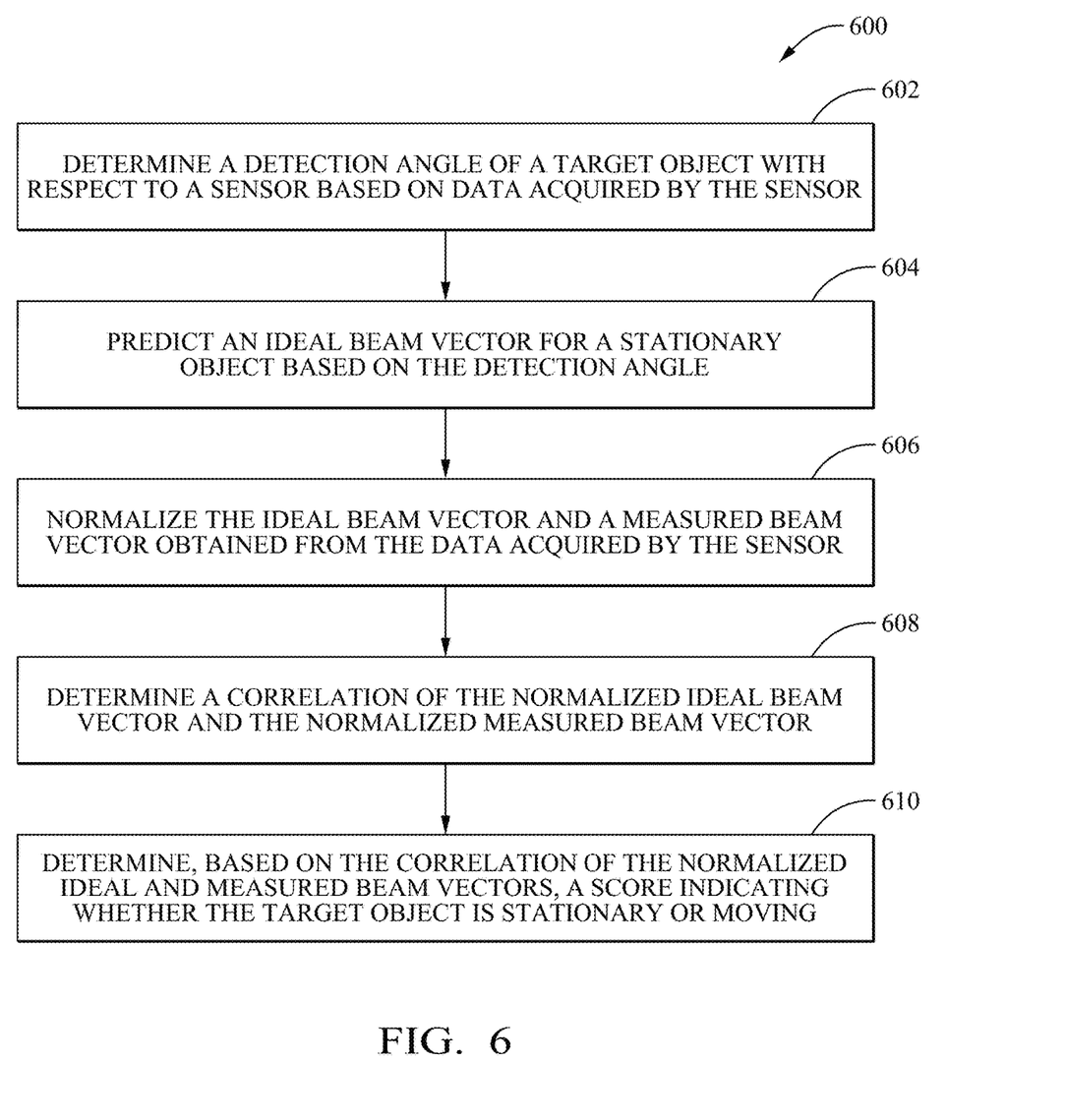

FIG. 6 shows a flow diagram 600 illustrating a method for determining a mobility status of a target object according to various embodiments. At 602, a detection angle of the target object may be determined. At 604, an ideal beam vector for a stationary object may be determined based on the detection angle. At 606, the ideal beam vector and a measured beam vector obtained from the data acquired by the sensor may be normalized. At 608, a correlation of the normalized ideal beam vector and the normalized measured beam vector may be determined. At 610, a score indicating whether the target object is stationary or moving may be determined based on the correlation of the normalized ideal and measured beam vectors.

According to various embodiments, the sensor may include a radar sensor and a range rate may be determined based on the data provided by the radar sensor.

According to various embodiments, determining the detection angle of the target object may include solving an algebraic equation.

According to various embodiments, if an ambiguity may be determined for the solution of the algebraic equation, a correlation of a beam vector derived from the sensor data and a reference vector may be used in order to resolve the ambiguity.

According to various embodiments, the sensor may include a radar sensor comprising a plurality of equally spaced antenna elements, and the ideal beam vector may depend on a ratio of the constant distance between the antenna elements and a wavelength of radar waves transmitted by the radar sensor.

According to various embodiments, calculating the correlation of the normalized ideal and measured beam vectors may include calculating a cosine coefficient based on the normalized ideal beam vector and the normalized measured beam vector.

According to various embodiments, a calibration matrix of the sensor may be applied to the measured beam vector before the measured beam vector is normalized.

According to various embodiments, the target object may be determined to be stationary if the score is greater than a predetermined threshold.

According to various embodiments, it may be determined for a plurality of detected target objects whether each of the respective target objects is stationary, and based on the number of detected stationary target objects, at least one dynamic parameter of a vehicle at which the sensor is installed may be determined.

According to various embodiments, the at least one dynamic parameter may include a linear velocity and/or an angular velocity of the vehicle.

Each of the steps 602, 604, 606, 608, 610 and the further steps described above may be performed by computer hardware components.

Figure 7:
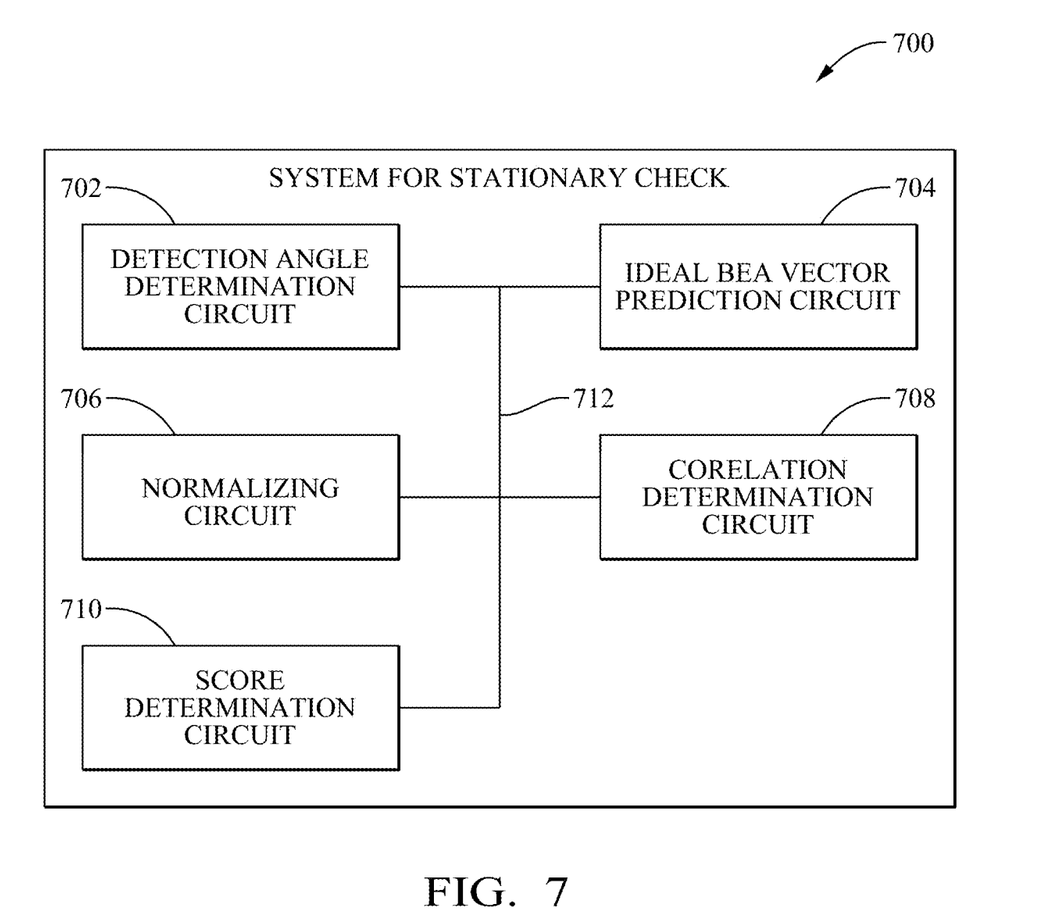

FIG. 7 shows a system 700 for performing a stationary check according to various embodiments. The system 700 may implemented in the processing unit 15 (see FIG. 1) and may determine whether a target object is stationary or moving. In detail, the system 700 may include a detection angle determination circuit 702, an ideal beam vector prediction circuit 704, a normalizing circuit 706, a correlation determination circuit 708, and a score determination circuit 710.

The detection angle determination circuit 702 may be configured to determine a detection angle of the target object. The ideal beam vector prediction circuit 704 may be configured to determine an ideal beam vector for a stationary object based on the detection angle. The normalizing circuit 706 may be configured to normalize the ideal beam vector and a measured beam vector obtained from the data acquired by the sensor. The correlation determination circuit 708 may be configured to determine a correlation of the normalized ideal beam vector and the normalized measured beam vector. The score determination circuit 710 may be configured to determine, based on the correlation of the normalized ideal and measured beam vectors, a score indicating whether the target object is stationary or moving.

The detection angle determination circuit 702, the ideal beam vector prediction circuit 704, the normalizing circuit 706, the correlation determination circuit 708, and the score determination circuit 710 may be coupled with each other, e.g. via an electrical connection 712, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 8:
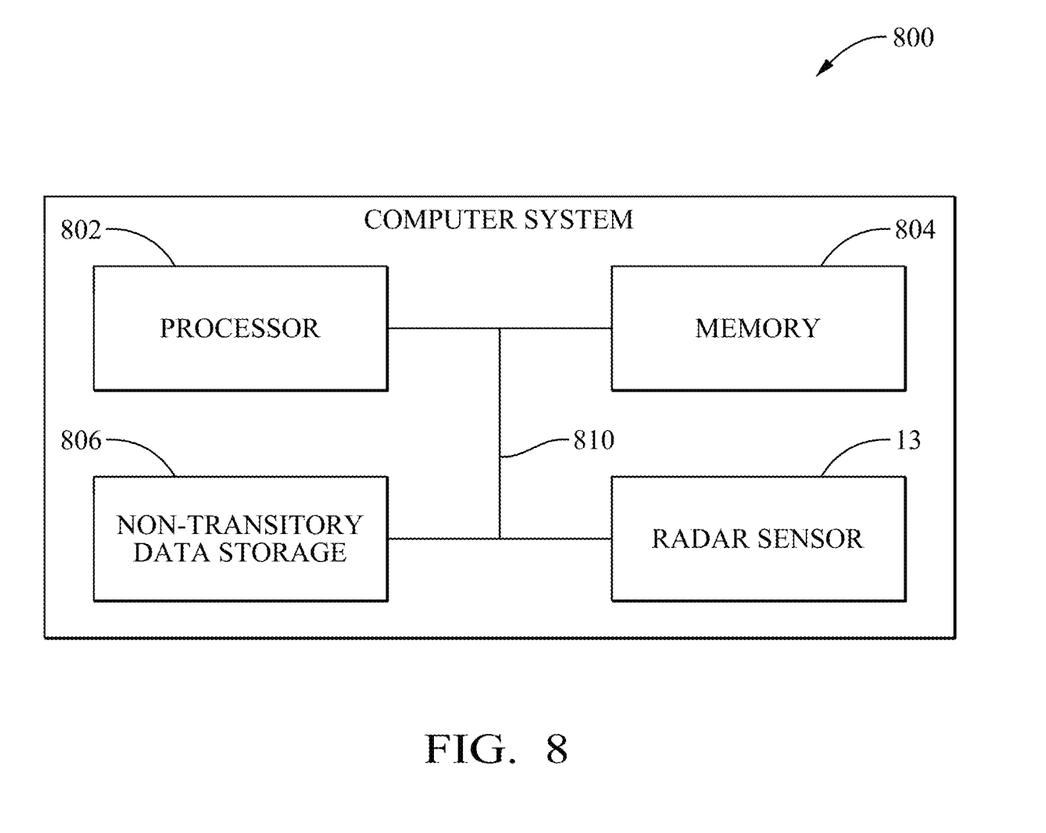

FIG. 8 depicts a computer system 800 with a plurality of computer hardware components configured to carry out steps of a computer implemented method for determining the stationarity of a target object according to various embodiments. The computer system 800 correspond to the computer system 11 as shown in FIG. 1 and may include a processor 802, a memory 804, and a non-transitory data storage 806. The radar sensor 13 (see FIG. 1) may be provided as part of the computer system 800 (like illustrated in FIG. 8), or may be provided external to the computer system 800. The processor 802, the memory 804 and the non-transitory data storage 806 may be components of the processing unit 15 (see FIG. 1).

The processor 802 may carry out instructions provided in the memory 804. The non-transitory data storage 806 may store a computer program, including the instructions that may be transferred to the memory 804 and then executed by the processor 802. The radar sensor 13 may be used for acquiring radar sensor data, based on which a range rate may be acquired.

The processor 802, the memory 804, and the non-transitory data storage 806 may be coupled with each other, e.g. via an electrical connection 810, such as e.g. a cable or a computer bus or via any other suitable electrical connection to exchange electrical signals. The radar sensor 13 may be coupled to the computer system 800, for example via an external interface, or may be provided as parts of the computer system (in other words: internal to the computer system, for example coupled via the electrical connection 810).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the system 700 and/or for the computer system 800.

The use of "example," "advantageous," and grammatically related terms means "serving as an example, instance, or illustration," and not "preferred" or "advantageous over other examples." Items represented in the accompanying figures and terms discussed herein may be indicative of one or more items or terms, and thus reference may be made interchangeably to single or plural forms of the items and terms in this written description. The use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"), unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

Reference Numeral List 10 host vehicle
11 computer system
13 radar sensor
15 processing unit
17 sensor coordinate system
19 x-axis
21 y-axis
23 moving object
25 stationary object
31 bar indicating the absolute value of the cosine coefficient
33 angle of ideal beam vector
35 angle of measured beam vector
41 azimuth angle from angle finding
43 azimuth angle from range rate
45 stationary objects from classical check
46 gap
47 moving objects and outliers from classical check
49 region with false classification of classical check
51 stationary objects from check using the method according to the disclosure
53 moving objects and outliers from the check using the method according to the disclosure
55 point cloud of outliers
61 angle from range rate
63 angle from Fourier transform
65 circles for classifying objects as stationary
67 circles for classifying objects as moving or outliers
600 flow diagram illustrating a method for determining a mobility status of a target object
602 step of determining a detection angle of a target object with respect to a sensor based on data acquired by the sensor
604 step of predicting an ideal beam vector for a stationary object based on the detection angle
606 step of normalizing the ideal beam vector and a measured beam vector obtained from the data acquired by the sensor
608 step of determining a correlation of the normalized ideal beam vector and the normalized measured beam vector
610 step of determining, based on the correlation of the normalized ideal and measured beam vectors, a score indicating whether the target object is stationary or moving
700 system for stationary check
702 detection angle determination circuit
704 ideal beam vector prediction circuit
706 normalizing circuit
708 correlation determination circuit
710 score determination circuit
712 connection
800 computer system according to various embodiments
802 processor
804 memory
806 non-transitory data storage
810 connection

What is claimed is:

1. A computer implemented method for determining a mobility status of a target object located in an environment of a radar sensor configured to monitor a surrounding environment of a vehicle, the method comprising:
    acquiring, by the radar sensor, radar detections;
    determining a detection angle of the target object with respect to the radar sensor based on data acquired by the radar sensor;
    predicting an ideal beam vector for a stationary object based on the detection angle;
    determining a measured beam vector for the target object from the data acquired by the radar sensor;
    normalizing the ideal beam vector and the measured beam vector;
    determining a correlation of the normalized ideal beam vector and the normalized measured beam vector; and
    determining, based on the correlation of the normalized ideal beam vector and the normalized measured beam vector, a score indicating whether the target object is stationary or moving.

2. The method according to claim 1, wherein a range rate is determined based on the data acquired by the radar sensor.

3. The method according to claim 1, wherein determining the detection angle of the target object further comprises:
    solving an algebraic equation.

4. The method according to claim 3, wherein if an ambiguity is determined for a solution of the algebraic equation, a correlation of a beam vector derived from the data acquired by the radar sensor and of a reference vector is used in order to resolve the ambiguity.

5. The method according to claim 1, wherein
the radar sensor comprises a plurality of equally spaced antenna elements; and
the ideal beam vector depends on a ratio of a constant distance between the antenna elements and a wavelength of radar waves transmitted by the radar sensor.

6. The method according to claim 1, wherein determining the correlation of the normalized ideal beam vector and the normalized measured beam vector further comprises:
calculating a cosine coefficient based on the normalized ideal beam vector and the normalized measured beam vector.

7. The method according to claim 1, further comprising:
applying a calibration matrix of the radar sensor to the measured beam vector.

8. The method according to claim 1, further comprising:
determining the target object is stationary if the score is greater than a predetermined threshold.

9. The method according to claim 8, further comprising:
determining, for a plurality of detected target objects, whether each respective detected target objects is stationary; and
determining, based on a number of the detected target objects that are stationary, at least one dynamic parameter of the vehicle on which the radar sensor is installed.

10. The method according to claim 9, wherein the at least one dynamic parameter includes a linear velocity of the vehicle.

11. The method according to claim 9, wherein the at least one dynamic parameter includes an angular velocity of the vehicle.

12. A computer system comprising:
a radar sensor configured to acquire radar detections; and
a plurality of computer hardware components configured to:
determine a detection angle of a target object with respect to the radar sensor based on data acquired by the radar sensor;
predict an ideal beam vector for a stationary object based on the detection angle;
determine a measured beam vector for the target object from the data acquired by the radar sensor;
normalize the ideal beam vector and the measured beam vector;
determine a correlation of the normalized ideal beam vector and the normalized measured beam vector; and
determine, based on the correlation of the normalized ideal beam vector and the normalized measured beam vector, a score indicating whether the target object is stationary or moving.

13. The computer system according to claim 12, wherein the plurality of computer hardware components are further configured to:
determine a range rate for the target object based on the radar detections; and
determine the measured beam vector based on the radar detections.

14. The computer system according to claim 12, wherein the determination that the score is greater than a predetermined threshold indicates that the target object is stationary.

15. The computer system according to claim 14, wherein the plurality of computer hardware components are further configured to:
determine, for a plurality of detected target objects, whether each of the respective target objects is stationary; and
determine, based on a number of detected stationary target objects, at least one dynamic parameter of a vehicle on which the radar sensor is installed.

16. The computer system according to claim 15, wherein the at least one dynamic parameter includes a linear velocity of the vehicle.

17. The computer system according to claim 15, wherein the at least one dynamic parameter includes an angular velocity of the vehicle.

18. A vehicle comprising:
a radar sensor; and
a computer system comprising a plurality of computer hardware components configured to:
determine a detection angle of a target object with respect to the radar sensor based on radar detection data acquired by the radar sensor;
predict an ideal beam vector for a stationary object based on the detection angle;
determine a measured beam vector for the target object from the radar detection data acquired by the radar sensor;
normalize the ideal beam vector and the measured beam vector;
determine a correlation of the normalized ideal beam vector and the normalized measured beam vector; and
determine, based on the correlation of the normalized ideal beam vector and the normalized measured beam vector, a score indicating whether the target object is stationary or moving.

19. The vehicle according to claim 18, wherein the radar sensor comprises a plurality of equally spaced antenna elements; and
the ideal beam vector depends on a ratio of a constant distance between the antenna elements and a wavelength of radar waves transmitted by the radar sensor.

20. The vehicle according to claim 18,
wherein determining the detection angle of the target object further comprises solving an algebraic equation, and
wherein if an ambiguity is determined for a solution of the algebraic equation, a correlation of a beam vector derived from the data acquired by the radar sensor and of a reference vector is used in order to resolve the ambiguity.

* * * * *